United States Patent [19]

Koppelmann

[11] Patent Number: 4,813,829

[45] Date of Patent: Mar. 21, 1989

[54] TOOLING APPARATUS COMPRISING A HOLDER AND TOOL HEAD RELEASABLY MOUNTED THEREON

[75] Inventor: Eldo K. Koppelmann, Cumberland, R.I.

[73] Assignee: Sandvik, Inc., Fair Lawn, N.J.

[21] Appl. No.: 171,579

[22] Filed: Mar. 22, 1988

[51] Int. Cl.[4] .............................................. B23C 00/00
[52] U.S. Cl. ..................................... 409/136; 279/81; 408/239 R; 408/238; 409/232
[58] Field of Search ...................... 409/136, 232, 234; 408/238, 239; 279/81, 91

[56] References Cited

U.S. PATENT DOCUMENTS

| | | |
|---|---|---|
| 2,485,799 | 10/1949 | Woytych . |
| 3,741,573 | 6/1973 | Treer .................................. 409/136 |
| 4,274,314 | 6/1981 | Repinski ............................. 408/239 |
| 4,325,664 | 4/1982 | Mori . |
| 4,563,116 | 1/1986 | Edens . |
| 4,575,293 | 3/1986 | Berti . |
| 4,655,655 | 4/1987 | Schurfeld . |

OTHER PUBLICATIONS

"Tool Changing and Setting", (Instruction Sheet), undated.
"Quick Changing Boring and Finishing Tools", Madison Industries, (Sales Brochure), 1968.

*Primary Examiner*—Leon Scott, Jr.
*Attorney, Agent, or Firm*—Burns, Doane, Swecker & Mathis

[57] ABSTRACT

A tooling assembly comprises a holder and a tool head releasably mounted thereon. The holder includes a forwardly projecting frusto-conical tongue which is tightly received within a correspondingly shaped socket of the tool holder. An actuator is slidably mounted within the holder and is retained within the tool head by means of a bayonet-type coupling. A pair of locking wedges is mounted in the holder and actuated by means of a differential screw to push the actuator rearwardly against a spring bias in a manner drawing the tool head tightly against the holder. Fluid channels in the holder body, actuator, and tool head communicate after the tool head has been mounted on the holder, in order to conduct flushing fluid to flush cuttings from the hole being cut.

11 Claims, 4 Drawing Sheets

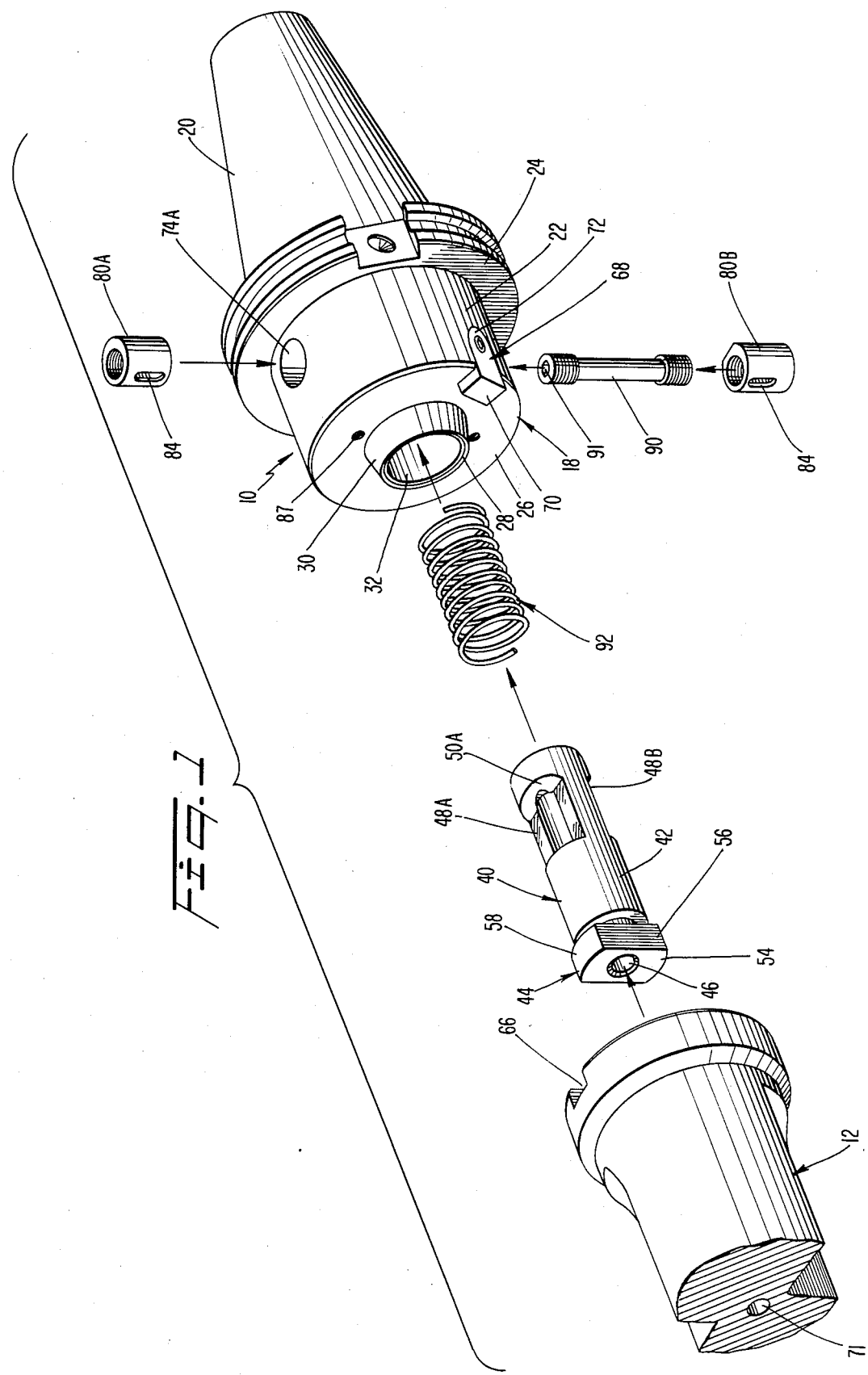

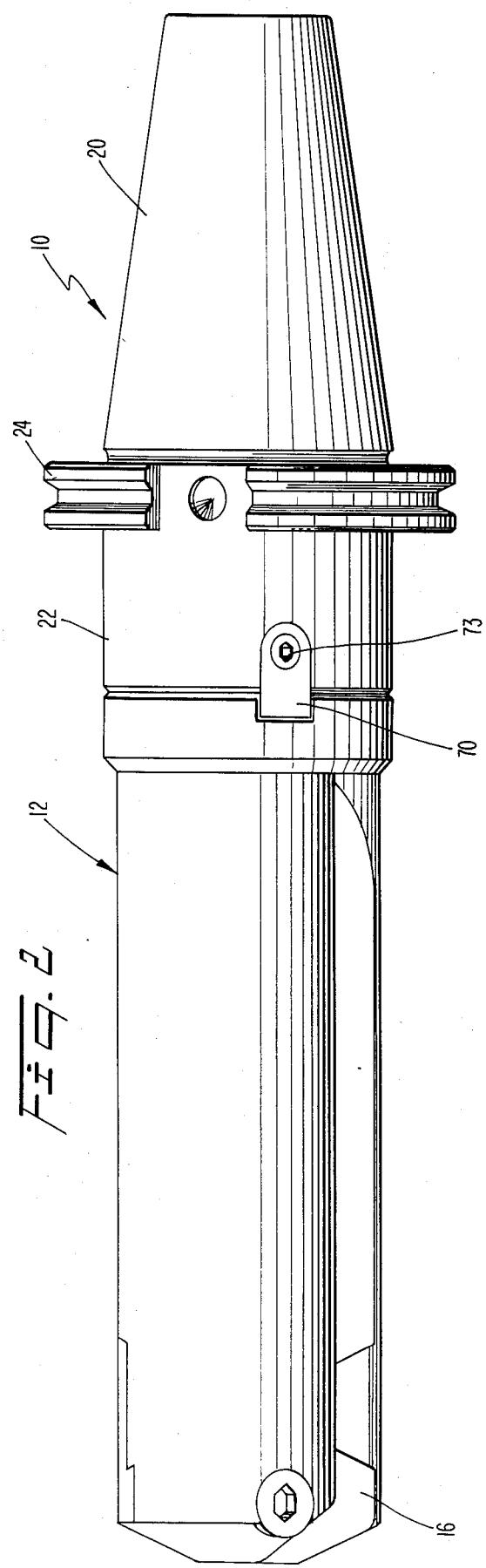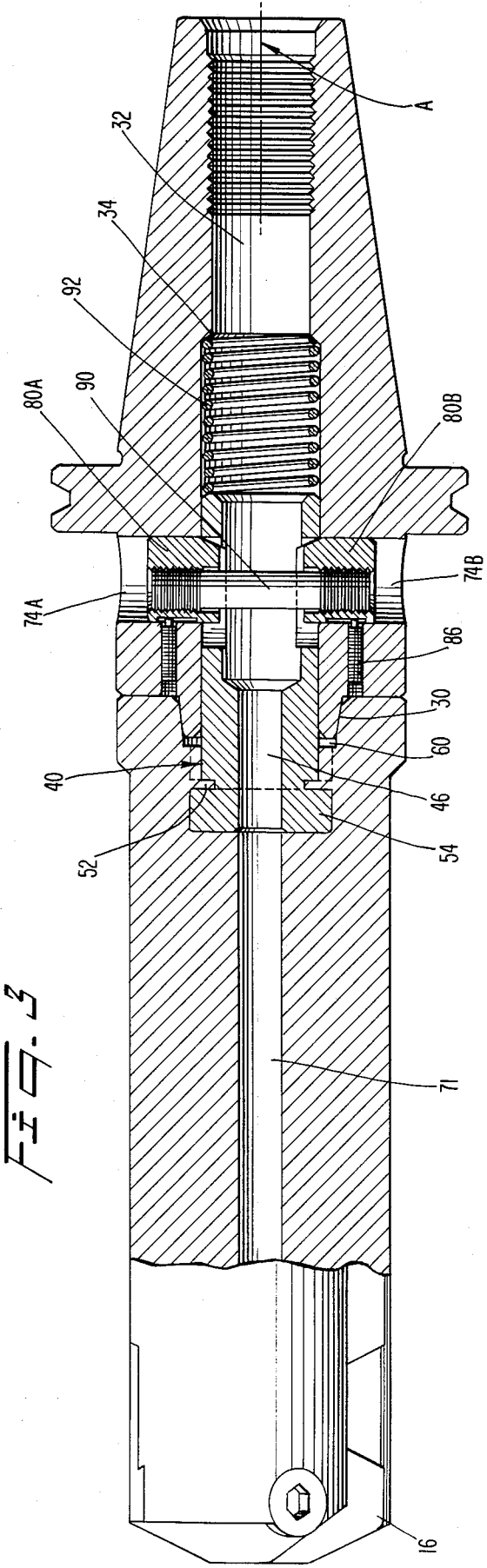

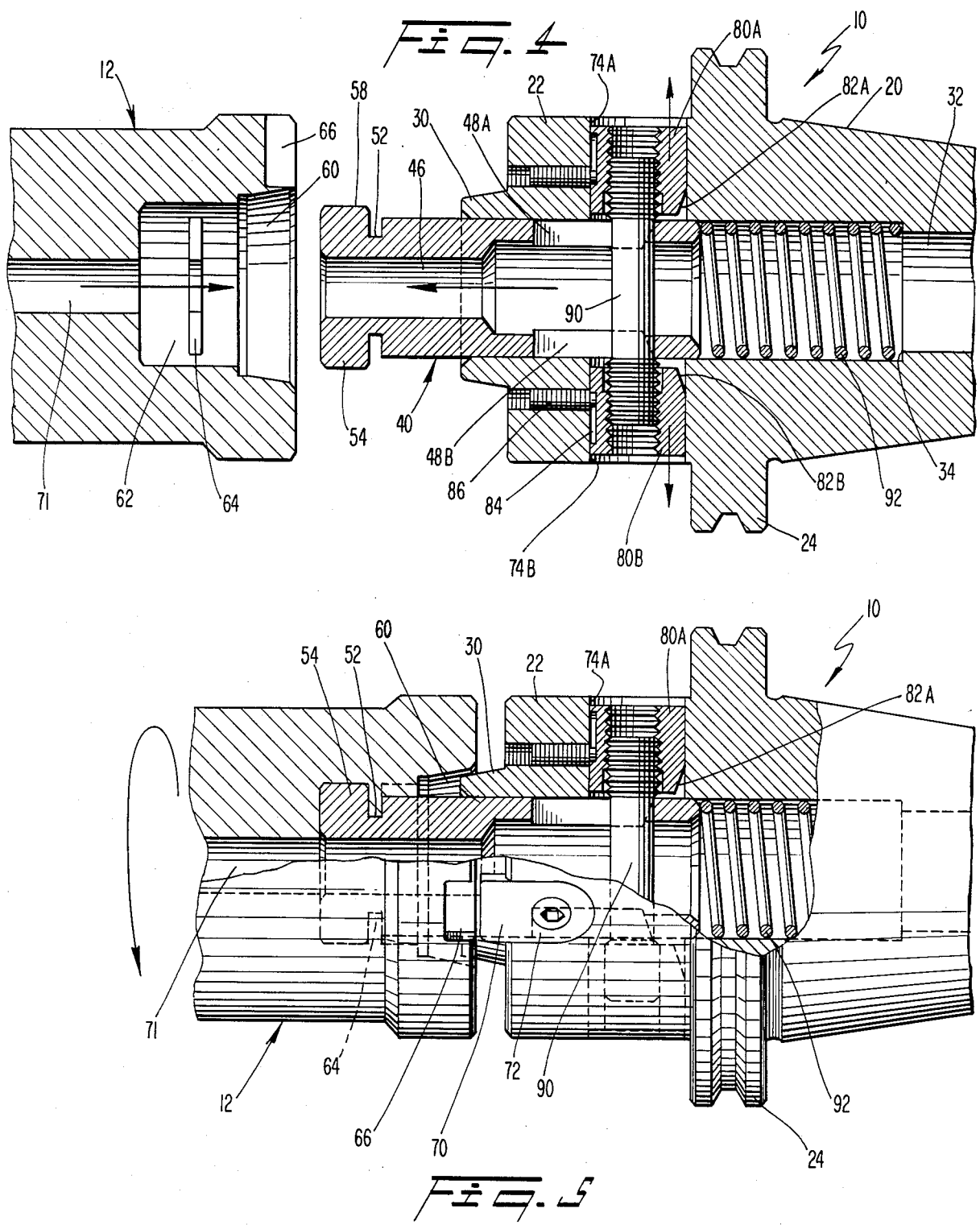

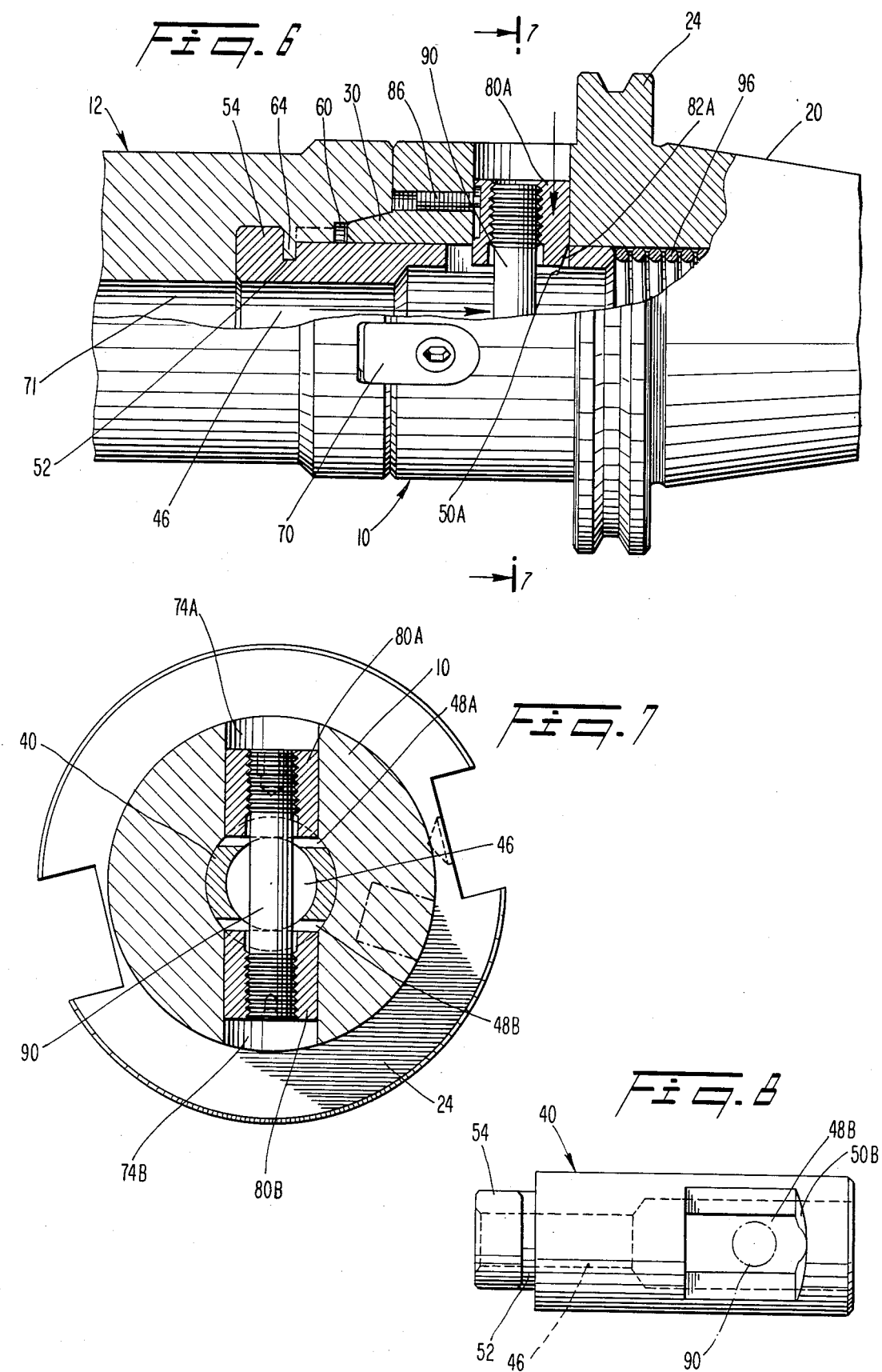

TOOLING APPARATUS COMPRISING A HOLDER AND TOOL HEAD RELEASABLY MOUNTED THEREON

BACKGROUND OF THE INVENTION

The present invention relates to a tooling apparatus and especially to a quick change system for enabling cutting heads to be rapidly replaced on a rotary holder.

Quick change systems of the above-mentioned type have been heretofore in use. In one such system a master bar or holder comprises a front mounting face from which projects a frusto-conical tongue and a pair of reciprocable draw bolts. Front ends of the draw bolts carry enlargements, each of which can be coupled to recesses of a cutting head by a bayonet-type of connection in response to rotation of the cutting head. Rear ends of the draw bolts are attached to a bolt support which is axially rearwardly displaceable by means of a manually rotatable eccentric in order to move the draw bolts rearwardly. In that way, a frusto-conical socket of the cutting head can be pulled against the tongue of the holder. Rearward movement of the bolt support is performed against the action of a spring, whereby the spring functions to push the bolt support, draw bolts, and cutting head forwardly when the eccentric is rotated out of its tool clamping position. The bolt support is capable of free pivoting movement to enable the draw bolts to pull with equal force in order to ensure a true seating of the head.

With such an arrangement difficulties have been experienced in applying sufficient retraction force to the tool head by means of the draw bolts in order to prevent the tool head from chattering. Furthermore, the presence of the eccentric actuator makes it very difficult to provide a fluid passage in the apparatus for supplying flushing fluid to the tool head for flushing out the cuttings, as required in modern machines of this type.

SUMMARY OF THE INVENTION

The present invention relates to a tooling apparatus comprising a tool head body and a holder assembly releasably connected thereto. The tool head body includes a front end having at least one mounting site for a cutter, and a rear end having a rearwardly open socket with a forwardly tapering frusto-conical surface. A first retaining portion, preferably in the form of a retaining recess, is arranged coaxial with the socket. A first fluid flow passage formed within the tool head body communicates with the socket and extends within the tool head body for conducting fluid which flushes cuttings. A first drive transmitting member, preferably in the form of a drive groove, is provided at the rear end of the tool head body. The holder assembly includes a holder body adapted to be rotated about a longitudinal axis. The holder body includes a front mounting surface which has a frusto-conical tongue extending forwardly therefrom. The tongue is coaxial with the axis and is configured to be tightly fitted within the socket of the tool head. A hole extends coaxially within the holder body and through the tongue to define a second fluid passage. A pair of lateral recesses is disposed in the holder body in communication with the hole. A second drive transmitting portion, preferably in the form of a drive key, is provided on the holder body and is adapted to be drivingly engaged with the first drive transmitting portion of the tool head. An actuator is slidably mounted in the hole of the holder. The actuator includes an actuator body having a second retaining portion, preferably in the form of an elongated arm, arranged coaxially with the longitudinal axis of the holder for connection with the first retaining portion of the tool head body in response to relative rotation between the tool head and the holder assembly. Such rotation also brings the first and second drive transmitting portions into longitudinal alignment. A third fluid passage extends within the actuator body and has a coaxially front discharge opening. A pair of circumferentially spaced inclined walls is located rearwardly of the retaining member. The actuator body is disposed in the hole such that the inclined walls communicate with respective ones of the lateral recesses. A spring biases the actuator forwardly. A pair of locking wedges is slidable in respective ones of the lateral recesses. Each locking wedge includes an inclined wedge surface at an inner end thereof. A wedge moving member, preferably in the form of a differential screw, is provided for moving the locking wedges toward the actuator to bring the wedge surfaces into engagement with the inclined walls to displace the actuator rearwardly against the spring bias for drawing the tool head rearwardly to tightly mate the socket with the tongue, with the first and second fluid passages in alignment.

BRIEF DESCRIPTION OF THE DRAWINGS

The objects and advantages of the invention will become apparent from the following detailed description of a preferred embodiment thereof, in connection with the accompanying drawings in which like numerals designate like elements, and in which:

FIG. 1 is an exploded perspective view of a tooling apparatus according to the present invention;

FIG. 2 is a side elevational view of the tooling apparatus with the tool head mounted on the holder assembly;

FIG. 3 is a longitudinal sectional view taken through the apparatus of FIG. 2;

FIG. 4 is a longitudinal sectional view taken through a rear portion of the tool head and a front portion of the holder as the tool head is moved rearwardly toward the holder;

FIG. 5 is a view similar to FIG. 4 after a retaining arm of the holder assembly has been locked within a bayonet recess of the tool head, and a drive groove of the tool head is longitudinally aligned with a drive key of the holder assembly;

FIG. 6 is a view similar to FIG. 5 in partial longitudinal section, after the locking wedges have been actuated to draw the tool head tightly against the holder;

FIG. 7 is a cross-sectional view taken along the line 7—7 of FIG. 6; and

FIG. 8 is a plan view of the actuator.

DETAILED DESCRIPTION OF A PREFERRED EMBODIMENT OF THE INVENTION

A preferred quick change tooling system according to the present invention comprises a tool holder assembly or master bar 10 to which a tool head is to be releasably connected. The holder assembly is adapted to be rotated about its longitudinal axis in order to rotate the tool head 12 which carries one or more cutters such as standard replaceable cutting inserts 16.

The holder assembly comprises a holder body 18 having a rear conical mounting portion 20, a cylindrical front portion 22, and an annular flange 24 at the junction between those portions 20, 22. The front portion 22 terminates in a front mounting face 26. Projecting forwardly from the mounting face is a seating tongue 28 having an outer frusto-conical seating surface 30. The tongue projects coaxially along a longitudinal center axis A of the holder body 18, and a circular hole 32 extends coaxially completely through the holder, forming a forwardly facing shoulder 34 (FIG. 4) within the tapered portion 20.

Slidably mounted in the hole 32 is an actuator 40 which includes a generally cylindrical body 42 having a T-shaped head 44 at its front end. A through-hole 46 extends coaxially completely through the actuator, and a pair of diametrically opposite grooves 48A, 48B is formed in the outer periphery of the actuator body intermediate front and rear ends thereof. A rear wall 50A, 50B of each groove is non-radially disposed, i.e., it is inclined in a direction radially outwardly and rearwardly. The grooves 48A, 48B communicate with one another by means of the through-hole 46.

As will be explained hereinafter, the actuator 40 is retained within the hole 32 of the holder body for longitudinal reciprocation and is constrained against rotation relative to the holder body.

The T-head 44 includes a narrow neck 52 (FIG. 4) and an elongated retaining arm 54 having flat sides 56 along its long dimension and curved faces 58 along its short dimension of the block.

The retaining arm 54 is adapted to be releasably coupled to the tool head 12 by a bayonet-type connection. That is, the rear end of a body of the tool head comprises a frusto-conical socket 60 dimensioned to conform to the frusto-conical shape of the tongue 30. A circular retaining recess 62 is disposed forwardly of the socket and communicates therewith by an elongate aperture 64. The recess 62 has a diameter approximating the long dimension of the arm 54, and the aperture 64 is shaped in complementary fashion to the arm 54. In this manner, the tool head can be attached to the actuator 44 by moving the tool head rearwardly until the retaining arm 54 passes through the socket 60 and the aperture 64 and enters the retaining recess 62. By then rotating the tool head a predetermined distance less than 180°, e.g., 90°, the arm 54 will be effectively retained in the recess 52. Such rotation is permitted by making the circumferential length of the recess greater than that of the aperture.

The rear end of the tool head 12 includes a drive groove 66 (FIGS. 1, 9), which becomes longitudinally aligned with a drive key 68 carried by the holder body 18 after the tool head 12 has been rotated a preselected distance relative to the actuator. The drive key 68 includes a drive section 70 which projects forwardly beyond the mounting face 26, and a mounting portion 72 which is releasably affixed to the holder body by means of a screw 72. As will be explained hereinafter, following the mounting of the tool head 12 onto the actuator 40, the actuator is moved rearwardly to cause the respective groove 66 to receive the drive key 68. As a result, rotation of the holder body will be transmitted to the tool body by means of the drive key.

The tool head body includes a fluid passage 71 which projects forwardly from the recess 62. That passage 71 becomes aligned with a discharge end of the actuator through-hole 46 once the tool head has been mounted on the actuator. The through-hole 46 defines a fluid passage which conducts flushing fluid from the holder to the fluid passage 71.

The actuator is disposed within the hole 32 of the holder such that the T-head 44 projects forwardly beyond the mounting face 26, and the grooves 48A, 48 are radially aligned with radial recesses 74A, 74B formed in the holder body (see FIG. 4). Disposed in respective recesses 74A, 74B are locking wedges 80A, 80B. The locking wedges are identical, each being of generally cylindrical configuration and including an inclined face 82A, 82B at its inner end. The faces 82A, 82B are inclined in complementary fashion to the inclined walls 50A, 50B of the actuator slots 48A, 48B, and are arranged to engage those walls 50A, 50B in response to radial inward displacement of the locking wedges.

Disposed along a side of each locking wedge 80A, 80B is a narrow channel 84 adapted to receive the head of a guide screw 86. The guide screws 86 enter the holder body 18 through openings 87 in the mounting face 26 thereof, and, when received in the channels 84, constrain the locking wedges to radial, non-rotational sliding movement in the recesses 74A, 74B, and serve as stops to limit radial movement of the locking wedges.

The locking wedges 80A, 80B are mounted at respective threaded ends of a transverse locking screw 90 which extends through the slots 48A, 48B and throughhole 46 of the actuator. One end of the screw contains a polygonal openings 91 for receiving a correspondingly shaped hand wrench, in order to rotate the locking screw. The threads at the ends of the locking screw 90 are of different helical direction, i.e., the screw 90 is a differential screw, so that rotation of the screw in one direction causes both locking wedges 80A, 80B to approach the actuator 40, and rotation thereof in the opposite direction causes both locking wedges 80A, 80B to travel away from the actuator.

It will be appreciated that when the inclined faces 82A, 82B of the locking wedges engage the inclined walls 50A, 50B of the actuator, the actuator is displaced rearwardly to pull the tool head 12 against the mounting face 26 of the holder body 18. Rotation of the actuator 40 relative to the holder body when the locking wedges are not in contact with the actuator is limited by the presence of the locking screw 90 in the throughhole 46 of the actuator. That screw 90 also prevents the actuator from being accidentally removed longitudinally from the holder body 18.

A coil compression spring 92 is disposed between the rear end of the actuator and the shoulder 34. Compression of that spring occurs in response to rearward movement of the actuator 40, whereupon the spring stores energy to be able to positively extend the actuator forwardly when the locking wedges are released from the actuator.

It will be appreciated that flushing fluid is conducted through the fluid passages 32, 46, 71 in order to flush cuttings from the hole being cut. The locking wedges 80A, 80'b are disposed with a tight fit within the respective lateral recesses 74A, 74B in order to minimize the leakage of flushing fluid, although a slight amount of leakage past the locking wedges and/or between the socket 60 and tongue 30 is acceptable.

IN OPERATION, a tool head is mounted on the actuator 40 by inserting the rear end of the tool head over the T-head 44 in such manner that the retaining arm 54 passes through the aperture 64 of the tool head and is received in the retaining recess 62. The tool head is then rotated by 90° relative to the holder, whereby the arm 54 becomes retained within the recess. At the same time, the drive groove 66 becomes longitudinally aligned with the drive key 68. Also, the fluid passage 46 in the actuator becomes aligned longitudinally with the fluid passage 71 in the tool head body (see FIGS. 6, 7).

Thereafter, the tool head 12 is pushed rearwardly against the bias of the spring 92, whereupon the drive key 68 is received in the drive groove 66. Then, a wrench is inserted into one of the lateral recesses 74A, 74B to rotate the locking screw 90 in a direction causing the locking wedges 80A, 80B to travel radially inwardly to bring the inclined surfaces 82A, 82B thereof into engagement with respective ones of the inclined walls 50A, 50B of the actuator. In this fashion, the actuator is displaced rearwardly to effect a tight engagement between the outer surface 30 of the tongue 28 and the wall of the socket 60.

It will be appreciated that with the tool head 12 thus coupled to the holder 10, rotation of the holder can be transmitted to the tool head to effect a hole-drilling operation, and flushing fluid can be conducted through the fluid passages 32, 46, 71 in order to flush cuttings from the hole being drilled.

In order to release the tool head, the locking screw 90 is rotated in a reverse direction so as to displace the locking wedges 80A, 80B radially outwardly, thereby enabling the spring 92 to displace the tool head forwardly to a position where it can be completely removed from the actuator by a suitable uncoupling of the bayonet connection 44, 62.

In accordance with the present invention, a relatively substantial rearwardly directed force can be applied by the actuator 40 to the tool head in order to effect a very tight engagement between the tool head and the holder in order to prevent chattering of the tool head during a cutting operation. Furthermore, flushing fluid can be conveniently conducted from the holder to the tool head in order to flush cuttings from the hole being cut. The apparatus is relatively inexpensive and yet simple to operate and maintain.

Although the present invention has been described in connection with a preferred embodiment thereof, it will be appreciated by those skilled in the art that additions, modifications, substitutions, and deletions not specifically described may be made without departing from the spirit and scope of the invention, as defined in the appended claims.

What is claimed is:

1. A tooling apparatus comprising:
   a tool head body including:
      a front end having at least one mounting site for a cutter,
      a rear end having a rearwardly opening socket with a forwardly tapering frusto-conical surface,
      first retaining means arranged coaxial with said socket,
      a first fluid passage communicating with said socket and extending within said tool head body for conducting fluid which flushes cuttings, and
      a first drive transmitting means at said rear end; and
   a holder assembly including:
      a holder body adapted to be rotated about a longitudinal axis and including a front mounting surface which has a frusto-conical tongue extending forwardly therefrom, said tongue being coaxial with said axis and configured to be tightly fitted within said socket, a hole extending coaxially within said holder body and through said tongue and defining a second fluid passage, a pair of lateral recesses disposed in said holder body and communicating with said hole, and a second drive transmitting means adapted to be drivingly engaged with said first drive transmitting means,
      an actuator slidably mounted in said hole, said actuator including:
         an actuator body having second retaining means arranged coaxially with said longitudinal axis for connection with said first retaining means on said tool head body in response to relative rotation between said tool head and said holder assembly which brings said first and second drive transmitting means into longitudinal alignment,
         a third fluid passage extending within said actuator body and having a coaxial front discharge opening, and
         a pair of circumferentially spaced inclined walls located rearwardly of said retaining member, said actuator body disposed in said hole such that said inclined walls communicate with respective ones of said lateral recesses,
      spring means for biasing said actuator forwardly,
      a pair of locking wedges slidable in respective ones of said lateral recesses, each locking wedge including an inclined wedge surface at an inner end thereof,
      wedge-moving means for moving said locking wedges toward said actuator to bring said wedge surfaces into engagement with said inclined walls to displace said actuator rearwardly against said spring bias for drawing said tool head body rearwardly to tightly mate said socket with said tongue and with said first and second fluid passages in alignment.

2. Apparatus according to claim 1, wherein said first and second retaining means form a bayonet-type of coupling.

3. Apparatus according to claim 2, wherein said first retaining means comprises a retaining recess disposed forwardly of said socket, and an elongated aperture interconnecting said socket and recess and being of shorter circumferential length than said recess, said second retaining means comprising a laterally disposed retaining member configured to extend through said aperture in said tool head body and become retained in said recess in response to relative rotation between said tool head and tool assembly.

4. Apparatus according to claim 3, wherein said elongated retaining member defines a forward end of said actuator.

5. Apparatus according to claim 1, wherein said spring means comprises a coil compression spring disposed in said hole rearwardly of said actuator.

6. Apparatus according to claim 1, wherein said wedge-moving means comprises a rotatable locking screw extending transversely through said actuator and having threaded ends threadedly connected with respective ones of said locking wedges, said threaded ends having oppositely directed screw threads.

7. Apparatus according to claim 1, wherein said inclined walls of said actuator comprise rear walls of diametrically disposed slots formed in an outer periphery of said actuator.

8. Apparatus according to claim 1, wherein said locking wedges are of circular cross-section, each locking wedge having a channel on its outer periphery, a pair of guide members mounted to said holder body and projecting into respective ones of said transverse recesses and into said channels to constrain said locking wedges against rotation.

9. A tool head adapted to carry a cutter and be releasably connected to a rotatable holder assembly, said tool head comprising a tool head body including front and rear ends, said front end having at least one mounting site for a cutter, said rear end having a rearwardly opening socket with a forwardly tapering frusto-conical surface adapted to tightly receive a correspondingly shaped tongue on a holder assembly, a retaining recess disposed forwardly of said socket, an elongated aperture interconnecting said socket and retaining recess and being of shorter circumferential length than said recess and adapted to receive a retaining member of a holder assembly, and a fluid passage extending within said body from a forward end of said recess for conducting flushing fluid from a holder assembly, said fluid passage being of smaller cross-section than said recess.

10. A holder assembly for releasably carrying a tool head and comprising:
    a holder body adapted to be rotated about a longitudinal axis and including:
        a front mounting surface having a frusto-conical tongue extending forwardly therefrom, said tongue being coaxial with said longitudinal axis and configured to be tightly fitted within a frusto-conical socket of a tool head,
        a hole extending coaxially within said holder body and through said tongue, said hole defining a first fluid passage,
        a pair of lateral recesses disposed in said holder body and communicating with said hole,
    an actuator slidably mounted in said hole, said actuator including an actuator body having
        a laterally disposed elongated retaining member at its front end adapted to be retained in a tool head, a second fluid passage extending therethrough and including a coaxial front discharge end, and
        a pair of diametrically opposed slots formed in an outer periphery of a generally cylindrical rear portion of said actuator body, each said slot including an inclined rear wall, said rear portion of said actuator disposed in said hole such that said slots communicate with said lateral recesses,
    spring means for biasing said actuator forwardly,
    a locking screw disposed in said lateral recesses and extending transversely through said slots and second fluid passage, and
    a pair of locking wedges mounted on respective ends of said locking screw, each locking wedge including an inclined wedge surface at an inner end thereof, said wedges being slidable in said lateral recesses and movable toward said actuator in response to rotation of said screw in one direction to bring said wedge surfaces into engagement with respective ones of said inclined walls of said slots to displace said actuator rearwardly against said spring bias for drawing said actuator rearwardly, in order to tightly mate said tool head socket with said tongue, said locking wedges being movable away from said inclined walls in response to reverse rotation of said locking screw.

11. A tooling apparatus comprising:
    a tool head body including:
        a front end having at least one mounting site for a cutter,
        a rear end having a rearwardly opening socket with a forwardly tapering frusto-conical surface,
        a retaining recess disposed forwardly of said socket,
        an elongated slot interconnecting said socket and retaining recess and being of shorter circumferential length than said recess, and
        a first fluid passage extending within said tool head body from a forward end of said retaining recess for conducting flushing fluid, and
    a holder assembly including:
        a holder body adapted to be rotated about a longitudinal axis and including a front mounting surface which has a frusto-conical tongue extending forwardly therefrom, said tongue being coaxial with said longitudinal axis and configured to be tightly fitted within said socket, a hole extending coaxially within said holder body and through said tongue, and a pair of lateral recesses disposed in said holder body and communicating with said hole,
        an actuator slidably mounted in said second fluid passage, said actuator including an actuator body having a laterally disposed elongated retaining member at its front end adapted to extend through said aperture in said tool head body and become locked in said retaining recess in response to relative rotation between said tool head body and said holder body, a third fluid passage extending axially through said actuator body for communicating said first fluid passage with said second fluid passage when said retaining member is locked in said retaining recess, and a pair of diametrically opposed slots formed in an outer periphery of a generally cylindrical rear portion of said actuator body, each said slot including an inclined rear wall, said generally cylindrical rear portion of said actuator disposed in said hole of said holder body such that said slots communicate with said lateral recesses,
        spring means in said hole for biasing said actuator forwardly;
        a locking screw extending transversely through said actuator slots, opposite ends of said screw containing oppositely wound screw threads disposed in respective ones of said transverse recesses,
        a pair of locking wedges threadedly mounted on respective threaded ends of said locking screw, each locking wedge including an inclined wedge surface at an inner end thereof, said wedges being non-rotatably slidable in said lateral recesses and movable toward said actuator in response to rotation of said screw in one direction to bring said wedge surfaces into engagement with respective ones of said inclined walls of said slots to displace said actuator rearwardly against said spring bias for drawing said tool head socket rearwardly into tight fit with said socket with said tongue, said locking wedges being movable away from said inclined walls in response to reverse rotation of said locking screw to separate said wedge surfaces from said inclined walls whereby said actuator is displaced forwardly by said spring means to separate said socket from said tongue.

* * * * *